Feb. 5, 1957
P. R. PUDWELL
2,780,370
GRAIN UNLOADER FOR VEHICLE BOX
Filed Aug. 14, 1953
2 Sheets-Sheet 1
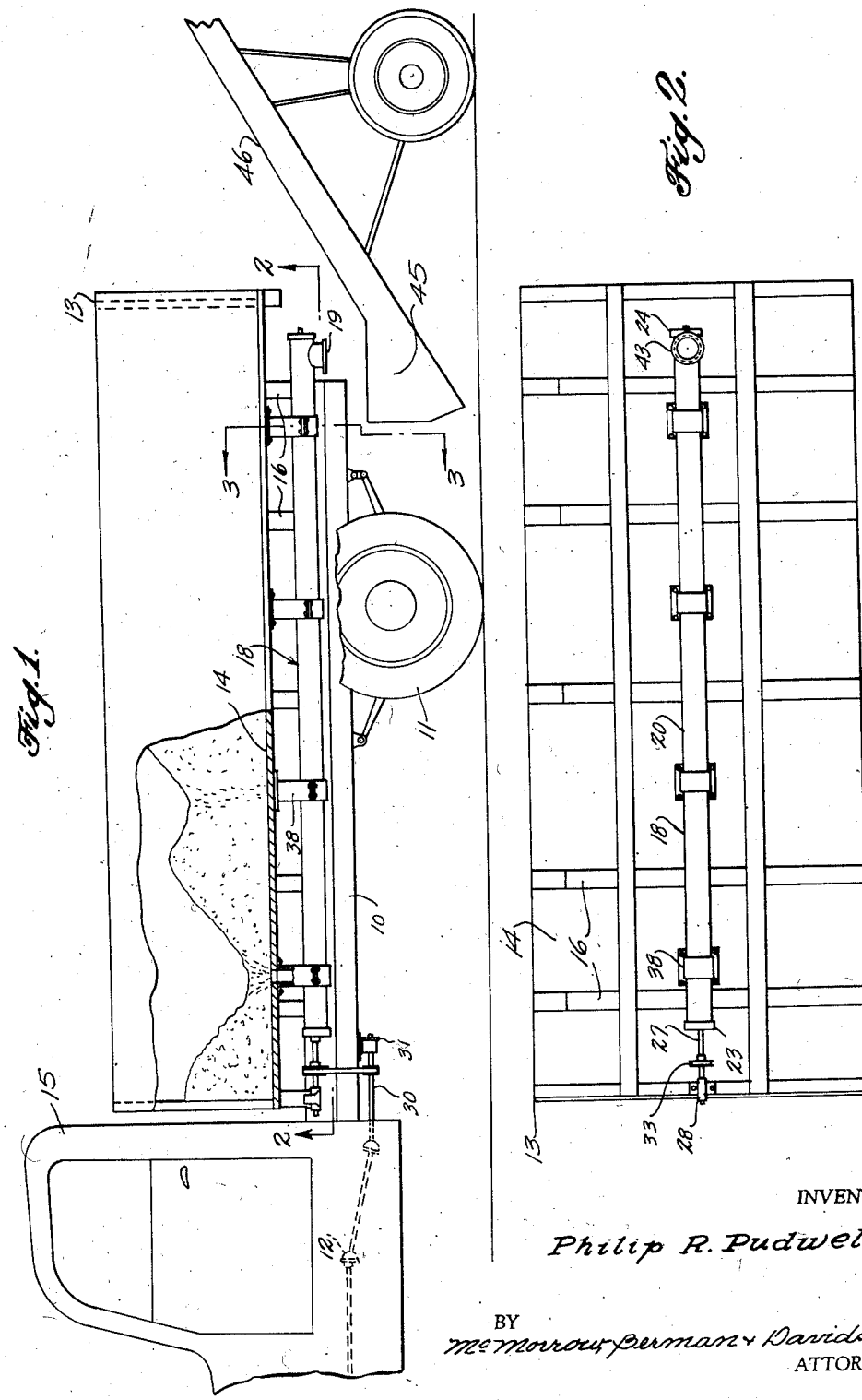
INVENTOR
Philip R. Pudwell.
BY
McMorrow Berman & Davidson
ATTORNEYS.

Feb. 5, 1957 P. R. PUDWELL 2,780,370
GRAIN UNLOADER FOR VEHICLE BOX
Filed Aug. 14, 1953 2 Sheets-Sheet 2
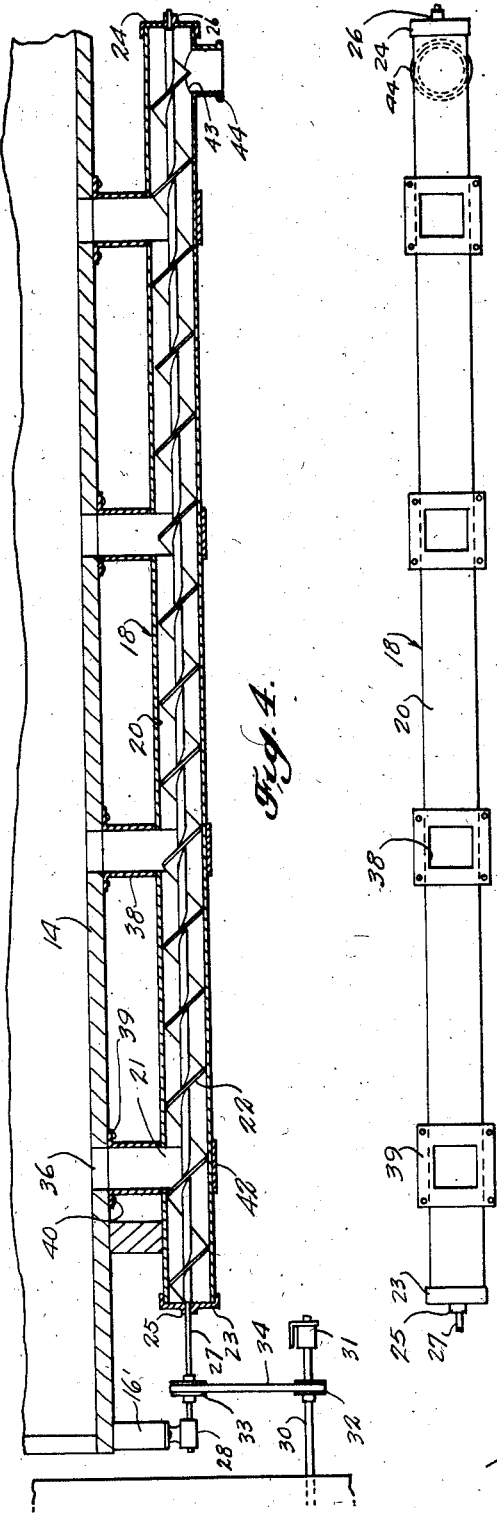
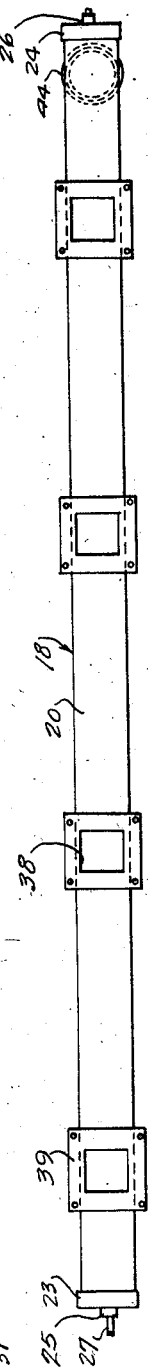
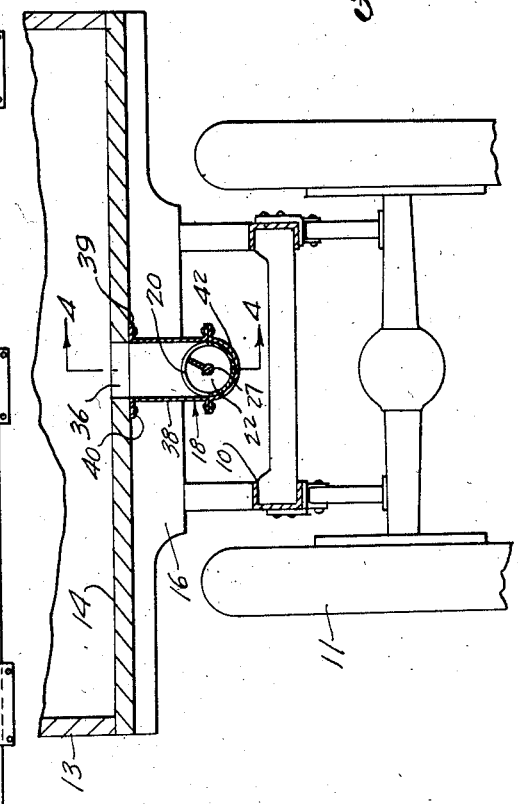
INVENTOR
Philip R. Pudwell,
BY
McMorrow, Berman & Davidson
ATTORNEYS.

2,780,370

GRAIN UNLOADER FOR VEHICLE BOX

Philip Richard Pudwell, Richmound, Saskatchewan, Canada

Application August 14, 1953, Serial No. 374,402

1 Claim. (Cl. 214—83.32)

This invention relates to power operated unloaders and more particularly to an unloader adapted to be mounted at the under side of a vehicle box or body to move granular bulk material, such as threshed grain, out of the associated box.

It is among the objects of the invention to provide an improved power operated grain unloader in the form of an auger type conveyor which can be disposed below a vehicle grain carrying box or body to extend longitudinally of the body medially of the width thereof; which can be securely mounted on the box without material modification of the box or interference with the box or any portion of the associated vehicle; which can be driven from a vehicle power take off connection and is effective to move granular bulk material, such as threshed grain, from the interior of the box and discharge the material at the rear end of the vehicle; which successively removes the grain from the box at locations spaced apart longitudinally of the box; which is disposed entirely within the limits of the associated vehicle box and is thus protected from damage during the use of the vehicle; and which is simple and durable in construction, economical to manufacture, easy to install, and efficient and effective in operation.

Other objects and advantages will become apparent from a consideration of the following description and the appended claim in conjunction with the accompanying drawings wherein:

Figure 1 is a side elevational view of a vehicle with a grain unloader illustrative of the invention operatively installed thereon, a portion of the vehicle being broken away and shown in cross section to better illustrate the application of the unloader thereto;

Figure 2 is a bottom plan view of the vehicle box and unloader illustrated in Figure 1;

Figure 3 is a fragmentary cross sectional view on an enlarged scale on the line 3—3 of Figure 1;

Figure 4 is a fragmentary cross sectional view on the line 4—4 of Figure 3; and

Figure 5 is a top plan view of the unloader separated from the associated vehicle box.

With continued reference to the drawings, the vehicle illustrated is a conventional truck having a frame 10 supported on rear drive wheels, as indicated at 11, and front drive wheels, not illustrated, and carrying the vehicle power plant and driving mechanism including a power take off connection 12. A box or body 13 of rectangular shape and having a flat floor 14 is mounted on the frame 10 to the rear of the truck cab 15 and is supported on suitable bolsters 16 which extend transversely of the frame and the box at substantially equally spaced apart locations along the frame and support the floor of the box above the frame.

As vehicles of the character illustrated are well known to the art, and as the unloader may be applied to various types of vehicles, including wagons or trailers, as well as trucks, a more detailed illustration and description of the truck is considered unnecessary for the purposes of the present disclosure.

The unloader comprises an elongated auger conveyor, generally indicated at 18, disposed below the floor 14 of the vehicle box 13 and extending longitudinally of the box medially of the width thereof. The front and rear ends of the conveyor are disposed inwardly of the front and rear ends of the associated vehicle box, so that the conveyor is protected from damage during the normal use of the vehicle and the conveyor is provided at its rear end with a downwardly facing discharge opening and discharge fitting 19.

The conveyor comprises an elongated tube 20 of cylindrical shape and uniform diameter having a length slightly less than the length of the associated vehicle box 13, and having openings, as indicated at 21, spaced apart at substantially equal intervals therealong. A screw auger 22 is disposed in the tube 20 and extends longitudinally of the tube from one end thereof to the other, having a diameter substantially equal to the internal diameter of the tube. The ends of the tube are closed by end caps 23 and 24 secured on the front and rear ends respectively of the tube and provided with bearing bosses 25 and 26 respectively, and the shaft 27 of the auger 22 extends through and is journaled in the bearing bosses 25 and 26.

At the front end of the conveyor the shaft 27 projects forwardly of the conveyor end cap 23 and is journaled at its front end in a bearing 28 mounted on the front bolster 16' of the vehicle box. A jackshaft 30 is journaled on the vehicle at its rear end by a vehicle mounted bearing 31 and is connected at its front end to the vehicle power take off connection 12. The jackshaft 30 is disposed in spaced and substantially parallel relationship to the auger shaft 27 and carries a belt pulley 32 intermediate the length thereof. The auger shaft 27 carries a belt pulley 33 and a V-belt 34 drivingly connects the belt pulley 32 to the belt pulley 33, so that the shaft 30, the belt pulleys 32 and 33 and the belt 34 provide a driving connection from the vehicle power take off connection 12 to the auger of the auger conveyor 18.

The vehicle floor 14 is provided with openings, as indicated at 36, substantially equally spaced apart longitudinally of the vehicle floor 14 and disposed medially of the width of the floor, each opening 36 being disposed directly above a corresponding opening 21 in the conveyor tube 20. Inlet ducts, as indicated at 38, extend between the conveyor tube 20 and the under surface of the vehicle box floor 14 and each inlet duct has its lower end disposed in surrounding relationship to a corresponding opening 21 in the tube 20 and its upper end disposed in surrounding relationship to the corresponding opening 36 in the vehicle box floor 14, each opening in the vehicle floor being connected to a corresponding opening in the conveyor tube by an associated inlet duct.

Each inlet duct is provided at its upper end through its full periphery with an outwardly extending, apertured flange, as indicated at 39, and bolts or screws, as indicated at 40, extend through the apertures in the inlet duct flanges and are threaded into or through the vehicle box floor 14 to firmly attach the conveyor to the floor. The openings 21 and 36 are preferably of rectangular shape and the inlet ducts 38 are also of rectangular cross sectional shape to fit the corresponding openings, and supporting bands 42 are secured to the inlet ducts and extend under the conveyor tube 20 to reinforce the connections between the lower ends of the inlet ducts and the conveyor tube.

The front and back walls of the ducts have semicircular recesses receiving the upper half of the conveyor tube, the edges of the recesses being in contact, for their full lengths, with the opposite edges of the openings 21 of the tube, each of which openings 21 extend through 180° of the tube circumference and are confined to the upper half thereof. The side walls of the ducts have outwardly directed bottom flanges and the supporting bands have outwardly directed flanges secured to the bottom flanges. Thus, in assembling the conveyor with the vehicle box, the ducts may first be connected to the floor of the box, after which the tube as a single unit is positioned in the recessed lower ends of the ducts, with the supporting bands then being extended under the tubes and bolted to the duct flanges to complete the assembly.

When the unloader is in operation, the grain or other bulk material falls through the openings 36 in the floor 14 and passes through the inlet ducts into the conveyor tube 20 and is moved rearwardly through the conveyor tube by the auger 22, being discharged at the rear end of the conveyor tube through the outlet opening 43 and the downwardly directed outlet fitting 44 into the hopper 45 at the lower end of an elevator 46 when the grain is to be elevated into a storage space or falling directly through the usual grating into the elevator of a commercial grain storage establishment. As the grain is removed from the box 13 by the conveyor, the grain will move first through the front opening 36 in the floor of the box as long as the front opening is completely covered, because at this time, the portion of the conveyor tube rearwardly of the front opening will be completely filled with grain. As soon as the portion of the box around the front opening has been emptied, the grain will then flow through the next opening to the rear until this portion of the box has also been emptied and will flow through successively rearwardly disposed openings and inlet ducts as the grain is progressively withdrawn from the box from the front to the rear end thereof.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

In a grain unloader adapted to be dependingly supported below and in spaced relation to a floor of a vehicle box, said floor having spaced openings formed therein through which grain may gravitate, an elongated tube of cylindrical shape and uniform diameter adapted to be extended below said vehicle box under the several openings, said tube being disposed horizontally and being formed with inlet openings aligned vertically with the openings of the vehicle box, said tube openings extending transversely of the tube through one-hundred and eighty degrees of the circumference of the tube, the openings being confined to the upper half of said circumference; and inlet ducts for the tube extending between the vehicle box openings and the tube openings and communicating at their opposite ends with the interior of the vehicle box and tube, respectively, through the respective aligned floor and tube openings, each inlet duct being of rectangular cross section and having a vertically disposed tubular portion formed at its upper end with an outwardly extending flange extending continuously through the full periphery of said portion and underlying said floor in contact therewith for connection of said flange to the floor, each duct being formed at its lower end with an outwardly directed flange on each of the opposite side walls of the duct and with semi-circular recesses in the front and back walls of the duct receiving the tube, the edges of said recesses being in contact, throughout their lengths, with the opposite edges of the respective tube openings; and semi-circular supporting bands extended transversely of the tube throughout the bottom half of the circumference of the tube, said supporting bands being formed separately from the ducts and tubes and being flanged at their opposite ends with the flanges of the supporting bands being secured to the bottom flanges of the inlet ducts, whereby to constitute said inlet ducts and supporting bands as suspending yokes for the tube, to support the tube horizontally at locations spaced along its length and corresponding to the number of openings in the floor, below the floor of said box.

References Cited in the file of this patent

UNITED STATES PATENTS

| | | |
|---|---|---|
| 2,052,169 | Darden | Aug. 25, 1936 |
| 2,110,262 | Curtis | Mar. 8, 1938 |
| 2,147,992 | Schau | Feb. 21, 1939 |
| 2,481,860 | Miller | Sept. 13, 1949 |
| 2,490,241 | Smith et al. | Dec. 6, 1949 |
| 2,601,618 | Kringle | June 24, 1952 |
| 2,633,255 | Hoffstetter | Mar. 31, 1953 |

FOREIGN PATENTS

| | | |
|---|---|---|
| 815,162 | Germany | Nov. 29, 1951 |